United States Patent [19]

Seitz et al.

[11] Patent Number: 5,410,543
[45] Date of Patent: Apr. 25, 1995

[54] METHOD FOR CONNECTING A MOBILE COMPUTER TO A COMPUTER NETWORK BY USING AN ADDRESS SERVER

[75] Inventors: Gregory W. Seitz, San Jose; Sean J. Findley, Gilroy; Philipp W. Beisel, Sunnyvale, Calif.

[73] Assignee: Apple Computer, Inc., Cupertino, Calif.

[21] Appl. No.: 270,517

[22] Filed: Jul. 5, 1994

Related U.S. Application Data

[63] Continuation of Ser. No. 50, Jan. 4, 1993, abandoned.

[51] Int. Cl.⁶ .......................... H04J 3/24; H04L 12/46
[52] U.S. Cl. ................................. 370/85.13; 370/92; 370/94.1; 370/95.1; 340/825.07
[58] Field of Search ............... 370/85.13, 85.14, 92, 370/93, 94.1, 95.1, 95.3; 340/825.07, 825.52

[56] References Cited

U.S. PATENT DOCUMENTS

| | | | |
|---|---|---|---|
| 4,989,204 | 1/1991 | Shimizu et al. | 370/60 X |
| 5,159,592 | 10/1992 | Perkins | 370/85.13 X |
| 5,181,200 | 1/1993 | Harrison | 370/95.1 X |
| 5,276,680 | 1/1994 | Messenger | 370/95.1 X |

*Primary Examiner*—Douglas W. Olms
*Assistant Examiner*—Melvin Marcelo
*Attorney, Agent, or Firm*—Mark A. Aaker

[57] ABSTRACT

This invention provides a method for connecting a mobile computer to a computer network by using an address server. The mobile computer connects itself to a network and requests an address server to represent it on the network. The address server accepts packets intended for the mobile computer and redirects them to the current actual address of the mobile computer. As the mobile computer moves, it reports its new actual address to the address server, so that packets intended for the mobile computer can be redirected to the new actual address.

7 Claims, 3 Drawing Sheets

METHOD FOR CONNECTING A MOBILE COMPUTER TO A COMPUTER NETWORK BY USING AN ADDRESS SERVER

This is a continuation of U.S. application Ser. No. 08/000,050, filed Jan. 4, 1993, abandoned.

BACKGROUND OF THE INVENTION

This invention relates to a method for establishing and maintaining data communications between a mobile or portable computer and an established computer network.

Computers can be connected by data communications links to form a network for the exchange of data and sharing of file storage and printing resources. A computer, printer, or file server can be a "node" on the network, and each node can be identified by an individual address on the network. A number of networks can be joined to form an internet, and each network can be identified by an individual network number on the internet.

A stationary computer such as a desktop or mainframe computer is usually connected to a network by physical cables, connectors or taps, and the computer remains at a fixed location with a fixed address and network number during communications sessions.

A mobile or portable computer, when connected to a network, is usually connected by wireless, radio, or infrared communications links, and may suddenly disappear, move or appear at a new location out of reach of its previous network address. This type of moving operation by a mobile computer can be referred to as "roving" communications by a roving node.

Using the currently available computer network protocols, when a mobile computer obtains a new address and network number, the previous communication sessions will be lost and new communication sessions will have to be established. What is desired is a method that is compatible with the currently available computer network protocols, and can provide continued communications sessions for a mobile computer that obtains a new address and network number as it moves.

Previous designs to support mobile computers have contained several limiting beliefs: a belief that it is necessary to have high level software services for restarting communication sessions; or a belief that all computers on the network needed their communications software to be updated to support mobile computers. What is desired is a method that supports mobile computers without change to the currently operating computers and communications software.

SUMMARY OF THE INVENTION

This invention provides a method for connecting a mobile computer to a computer network by using an address server. This method is compatible with the currently available computer network protocols, and can provide continued communications sessions for a mobile computer that obtains a new address and network number as it moves. This method supports mobile computers without change to the currently operating computers and communications software.

In this method, the mobile computer connects itself to a network and requests an address server to represent it on the network. The address server accepts packets intended for the mobile computer and redirects them to the current actual address of the mobile computer. As the mobile computer moves, it reports its new actual address to the address server, so that packets intended for the mobile computer can be redirected to the new actual address.

In more detail, this invention provides a method for connecting a mobile computer to a computer network on an internet of connected networks by using an address server, the method comprising the steps of: establishing the address server on a network on the internet; representing the mobile computer by an address on the address server; connecting the mobile computer to a network on the internet, and reporting its new network and new actual address to the address server; redirecting packets intended for the mobile computer from the address server to the new network and new actual address of the mobile computer; and repeating the connecting and redirecting steps as the mobile computer moves to new networks and addresses.

In this way, the mobile computer can move and acquire a new address on a new network, but its communication sessions will be maintained and continued so long as it reports its new address to the address server representing it on the internet. This is accomplished without any change to the communications protocols in use, and does not requires changes to the software on any other computers on the network, only on the mobile computer and address server.

DETAILED DESCRIPTION

This invention provides a method for connecting a mobile computer to a computer network by using an address server. One architecture for constructing and interconnecting computers and networks is the AppleTalk network system described in "Inside AppleTalk" published by Addison-Wesley Publishing company and copyright 1989, 1990 by Apple Computer, Inc. (AppleTalk and Apple are registered trademarks of Apple Computer, Inc.) The AppleTalk network system will be used to illustrate a specific preferred embodiment of the invention, although the invention can be used with other network systems and communication protocols.

Figure 1:
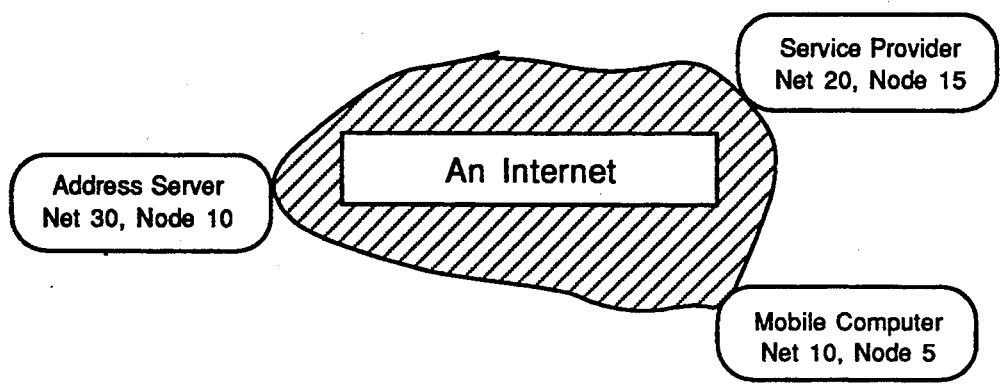
FIG. 1 shows a pictorial representation of an internet, with an attached mobile computer, service provider computer, and address server computer.

FIG. 1 shows a pictorial representation of an internet, with an attached mobile computer, service provider computer, and address server computer. The internet can be a single network or collection of networks in accordance with the AppleTalk standards, and may include wireless, radio, or infrared communications links for supporting mobile or portable computers. In particular, it is expected that roving nodes will be supported by wireless communications services covering a building, floor within a building, or rooms within a building.

The mobile computer is a portable or handheld device with communications capabilities such as wireless, radio, or infrared communications, that can be moved from location to location, connecting by different node addresses to the networks of the internet as it moves about.

The service provider computer is a device such as a computer, printer or file server which provides services to other computers by communicating with them over the internet. The service provider could be a desktop computer that is also used by the person carrying the mobile computer, or could be a separate dedicated computer, fixed or mobile, for providing electronic mail, file storage, or database access to the mobile computer.

The address server computer is a node on the AppleTalk internet that provides a service of representing additional addresses on the internet for the benefit of clients. The address server takes messages sent to the represented address and redirects them to the actual address of the client. This service can be used to represent mobile computers which may change their actual addresses, or to establish services at "well-known" addresses which are actually supported by devices at other actual addresses. The ability to represent more than one address to a network or internet is preferably implemented in software without the necessity for multiple physical connections to the network. This capability for the AppleTalk network system is referred to as a "multinode" capability. An address server can be implemented as a processing task on any stationary node on the internet.

In the method of the invention, mobile nodes are represented somewhere on the internet by an address on an address server. The address server accepts messages on behalf of the roving node and redirects them to the current address of the mobile node. As the mobile node moves, it informs the address server of its new actual address. Additional specific details on how to initiate, maintain, and terminate these operations follows below.

The mobile node obtains a connection to a network, and locates an address server to represent it. The mobile computer uses the dynamic node assignment capability in the AppleTalk communication protocols to join to a network when it can, such as when it is within range of a wireless communication service. The mobile computer will obtain an unused address on the local network which can be used to allow communications to proceed.

Figure 2:
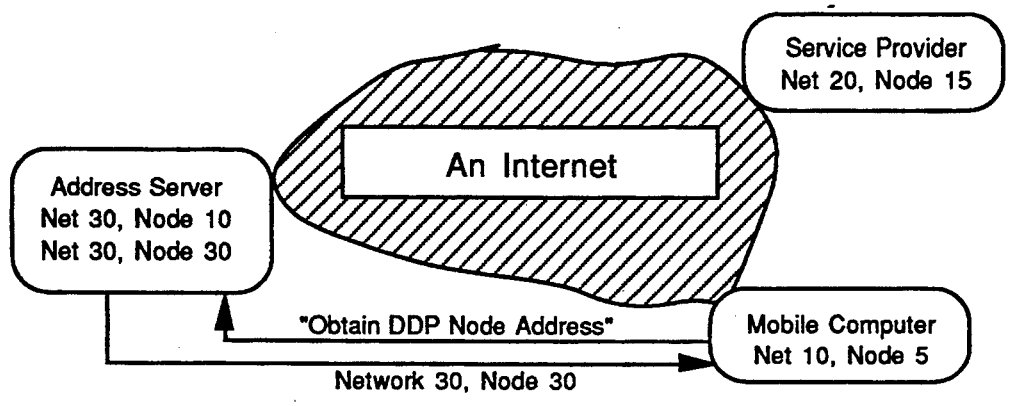
FIG. 2 shows an initial message exchange for the mobile computer to obtain a represented address on the address server.

The representation is established by an initial dialogue in which the mobile node asks for a represented address and provides its actual address to the address server. FIG. 2 shows an initial message exchange for the mobile node to obtain a represented address on the address server. Specifically, in the terminology of the AppleTalk network system, a mobile node acquires a represented or surrogate DDP (Datagram Delivery Protocol) node address by first locating an address server through normal NBP (Name Binding Protocol) lookups. It then acquires an address on the address server using a simple ATP (AppleTalk Transaction Protocol) transaction. As shown in FIG. 2, the mobile node actually resides at Network Number 10 and Node Address 5 (10,5). The mobile node requests a represented address from the Address Server, and is assigned a represented address of Network Number 30 and Node Address 30 (30,30). The address server uses multinode addressing capability to establish multiple DDP addresses for one or several clients.

Figure 3:
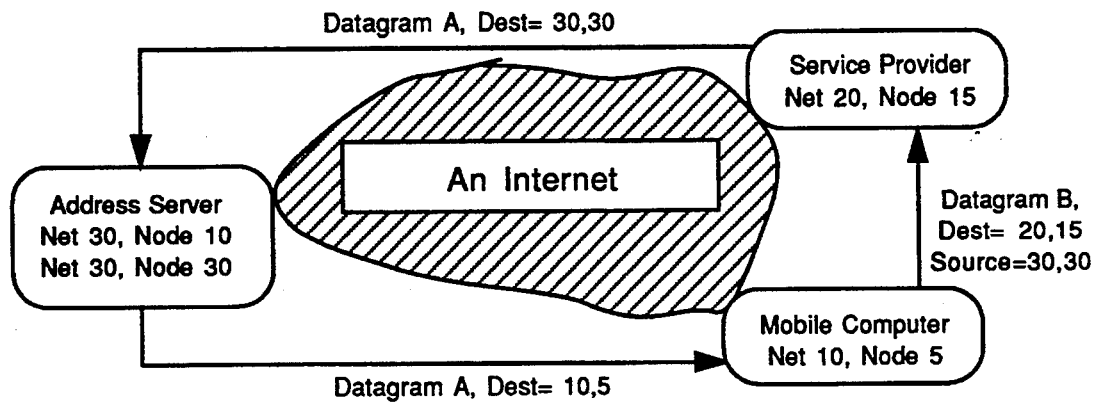
FIG. 3 shows the use of the represented address in communications between the mobile computer and other network computers, such as a service provider.

The representation is maintained by the mobile node listing the represented address as the "source address," or address to direct responses to, as it interacts with services on the network. FIG. 3 shows the use of the represented address in communications between the mobile node and other network computers, such as a service provider. The acquired node address, e.g. (30,30), is placed in the DDP source information of any outgoing datagram from the mobile computer, as well as in key address fields of well-known protocols (i.e. NBP). A mobile node is different from a normal AppleTalk node mainly in the substitution of DDP source address information in all outgoing packets. It is also capable of dynamically switching its actual DDP node address without disrupting currently established services.

Any communication with the mobile node will be through its represented or surrogate address. The address server maintains a list of represented addresses and their corresponding currently-known DDP addresses. As shown in FIG. 3, an incoming datagram packet directed to (30,30) will be received at the address server and redirected to the actual address of (10,5). A mobile node depends on the address server only for incoming datagrams, since outgoing datagrams may be sent directly to their destination, as shown in FIG. 3.

Figure 4:
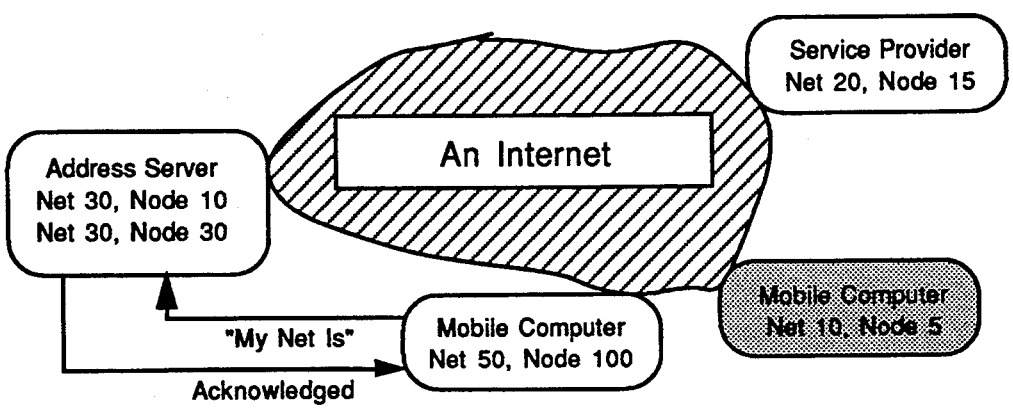
FIG. 4 shows an exchange for the mobile computer to report a new actual address to the address server when the mobile computer has moved to a new location on the internet.

When moving about, the representation is maintained for a mobile node by the mobile node informing the address server of its new actual address, so that the represented address remains constant but the actual address to which messages are redirected is updated. FIG. 4 shows an exchange for the mobile computer to report a new actual address to the address server when the mobile computer has moved to a new location on the internet.

As the mobile node moves throughout the physical domain of the internet, it will "adapt" to the identity of the network it can currently connect to. To do this, RTMP (Routing Table Maintenance Protocol) data packets broadcast by routers are monitored for a change in network information. When a change is detected, the mobile node dynamically acquires a new DDP address consistent with the new network. At regular intervals, or whenever a change is detected, the mobile node informs the address server of the status of its current DDP address information. Again, a simple ATP exchange of this data is used.

It is possible for the address sewer to fail. When this happens, open sessions between a mobile node and ongoing services become unreachable. It is possible for the mobile node to find another address server and acquire the original represented address. For this to occur, an alternate address server must be within the same AppleTalk zone and cable range as the failed address server, and the address must still be available. Hence, the desired degree of reliability can be achieved through proper network planning and redundancy in address servers.

It is desirable for existing higher level protocols and services to adapt their communication parameters such as "session timeout value" for mobile nodes. It is possible that a mobile node with be "out of contact" with its address server for some extended time while moving. For example, moving from one building to another could take several minutes; however, some standard AppleShare protocol sessions will timeout in 2 minutes. It is possible for the address server to provide representation that maintains the session for longer time values by providing periodic responses that keep the session "alive."

In applying the AppleTalk "Zone" mechanism, the default zone of the mobile node is the same as the zone the address server appears in. The zone of the mobile node remains the same as it moves throughout the network.

As mentioned above, the initiation, maintenance and termination of a walkabout connection to an internet is achieved using ATP transaction exchanges. A convenient method for tracking these transactions is in a transaction record having the following fields: Version; Command; Result of the call; Session identification; Address information; Session time out value; Address hint information; and Reserved for future use.

On the mobile computer, when selecting a "mobile" type of network connection in the mobile computer's "Control Panel," the user establishes the potential for a computer to be moved about an internet. When AppleTalk is started for a mobile type of network connection, a NBP lookup is done to locate an address server. The zone for this lookup might be pre-stored in the parameter RAM of the computer, in place of the current zone hint.

Once located, a request for a surrogate address is made to the address server, using an "exactly once" transaction, which responds with a surrogate DDP node address through which all datagrams will be delivered to the mobile node. The request contains a Session identification field which represents the socket used by the mobile node to exchange messages with the address server. The value in the Session time out value field of the transaction record specifies to the address server the number of seconds that must elapse without receiving a request from the mobile node before disconnecting. The data in the Address hint information field of a transaction record can request a specific DDP address that the mobile node wishes to obtain, usually for connection recovery purposes.

A negative response from the server, such as "no DDP addresses available", or failure to locate the server will result in the node being unable to rove. This state can be changed subsequently by attempting to connect again.

Once established, a mobile node is free to relocate anywhere on an AppleTalk internet. It can use AppleTalk just like a normal node. In fact, from the user's perspective, roving is completely transparent.

To maintain a connection with an address server, a request is made to the address server at regular intervals, e.g. every 15 seconds. This transaction serves to both maintain the connection and to inform the address server of movement by the roving node. The request contains the current actual DDP node address of the roving node. This data serves as the forwarding address for all datagrams directed and broadcast to the surrogate address associated with a roving node. The request can be made as an "at least once" ATP transaction.

The roving node monitors RTMP packets from routers and compares the stated network to its current network. A change in this data causes the roving node to immediately seek a new DDP address that is compatible with the new network. After doing so, a request is immediately, and with a greater frequency, made to the address server to inform it of the change. This is done in an expedient manner to minimize disruption in traffic to services on the internet. An acknowledgement from the address server returns the connection maintenance to a "normal" state, i.e. to a normal frequency of requests.

Acknowledgements from the address server can also serve to trigger a recovery mechanism by the roving node. As mentioned earlier, redundancy in address server configurations can mitigate "central points of failure". A succession of non-responses to requests can be a signal to the roving node that the address server has become unavailable. In an attempt to save sessions established with services on the internet, the roving node can relocate to an address server elsewhere in the same zone. This process can be further refined to locate one whose network address is compatible with the roving node's last known surrogate address. A request for a surrogate address is then made of the server using the last known surrogate DPP address in the data field. If the server can comply with the request, i.e. obtain the desired DDP address, then services can continue without disruption. If however the DDP address returned is different, then those services will eventually terminate by timeout, etc.

When a roving node closes AppleTalk, e.g., by selecting a non-roving network connection, as a courtesy a roving node sends a request which indicates that roving is done request to the address server. This informs the address server that the surrogate DDP address associated with the roving node has become eligible for reuse. After sending a request which indicates that roving is done, the roving node disables the recovery mechanisms discussed above.

The address server is responsible for directing datagrams sent to a surrogate DDP address to the actual DDP address. It also delivers a copy of all broadcast packets except for RTMP data packets directed to the RTMP socket. The address server does not allow broadcasted RTMP response packets to be sent to the mobile node; since doing so could cause the mobile node to interpret these packets as movement to a new location, and it could attempt to acquire an new, but improper network address. This prevents the roving node from erroneously behaving as if a new network has been discovered.

The roving node must do a little more work. RTMP data packets delivered to the RTMP socket must be monitored for changes in network information. To support the notion of the home zone, several operations in ZIP (Zone Information Protocol) and NBP must also be monitored. For NBP, incoming lookup packets must be rejected if they are not destined for our zone. For ZIP, GetMyZone and GetLocalZones packets, as defined in the AppleTalk protocols, must be intercepted. Both must always return the home zone. Roving nodes must also have the ability to obtain a new DDP address at any time.

Figure 5:
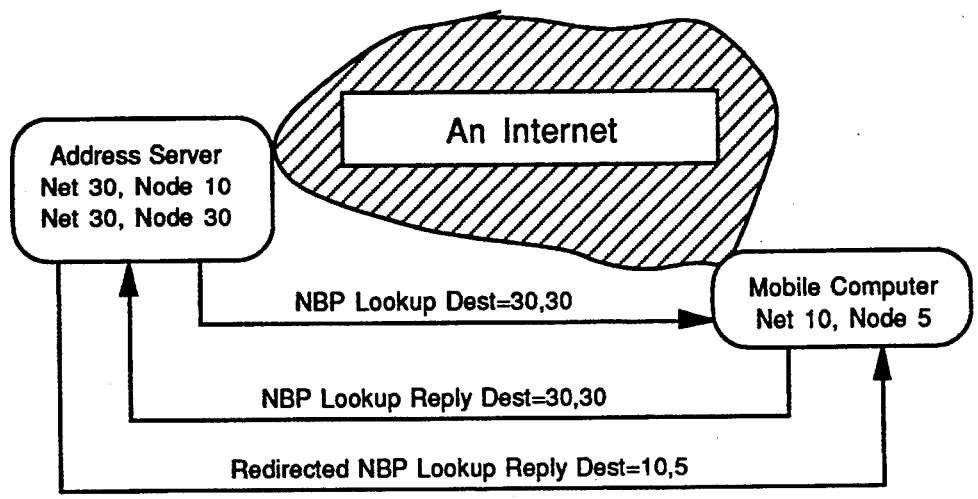
FIG. 5 shows an exchange for the mobile computer to locate and communicate with services located internally on its own node.

The concept of sending a packet to oneself is a very powerful feature in the AppleTalk system. On a roving node, source DDP address information is always the surrogate address given by the address server. Thus to send a datagram to an intranode entity found using NBP, the packet would first be sent to the address server then redirected back to the roving node at the current actual DDP address. FIG. 5 shows an exchange for the mobile computer to locate and communicate with services located internally on its own node. In FIG. 5, the roving node receives a directed NBP lookup packet from the address server at (10,5). This is the result of a Lookup Broadcast Request from the roving node itself sent to some router (not shown) with the NBP network origin of (30,30). A Lookup Reply is of course sent to (30,30) with (30,30) as the DDP source address, which is in turn redirected to the actual DDP address (10,5). Clearly, extra traffic and interaction with the server is caused by intranode communication. To reduce the overhead, the roving node can monitor outbound DDP destination addresses. One destined for it's surrogate address can be replaced with the actual DDP address and the packet delivered like a normal packet addressed to a service residing internally.

If a roving node is using intranode services, and the address server becomes unavailable such that the recovery mechanism changes the surrogate address, those services would then be disrupted. To solve this problem specifically, as well as to create a general-purpose method for delivering intranode packets, a new AppleTalk addressing convention for packets addressed to a service residing internally is proposed. Any datagram addressed to network $FFFF, node 0 (zero), will always be interpreted to mean to this node. This can be referred to as always our address.

Any NBP lookup received by a roving node that is determined to have originated on that node shall have the always our address placed into the NBP DDP origin. Thus intranode services will always be directing their data to always our address, and will be unaffected by the state of the address server. Note that this new addressing convention applies to non-roving nodes as well. DDP would be modified to send packets destined to always our address to our own node.

In summary, as implemented in AppleTalk, this mobile or roving AppleTalk architecture provides a scalable and backwards compatible extension to the AppleTalk protocols. Since it is primarily a DDP level change, it will not affect existing services, unless they pass network numbers around in their data. No distinction need be made between roving and non-roving nodes for it to function properly. For improved efficiency however, it is possible for two nodes to communicate without the help of the address server. To do this, they must be willing to take responsibility for tracking the changes in the network address of the each others nodes.

Other apparatus for implementing this invention would use other networking protocols. However, the same methods can be applied of obtaining a represented address from an address server, communicating with network services through the represented address, and informing the address server of changes in the actual address. Other embodiments and variations of the invention will be apparent to one skilled in the art from a consideration of the specification drawings, and claims. It is intended that the scope of the invention be limited only by the scope of the following claims.

We claim:

1. A method for connecting a mobile computer to a computer network by using an address server, the method comprising the steps of:
   establishing the address server on the network;
   representing the mobile computer by a represented address on the address server;
   connecting the mobile computer to the network, and reporting its new actual address to the address server;
   at the address server, redirecting messages to the represented address to the new actual address of the mobile computer, except blocking broadcasted routing table maintenance protocol messages; and
   repeating the connecting and redirecting steps as the mobile computer moves to new addresses on the network.

2. A method as in claim 1 wherein the step of representing the mobile computer by a represented address on the address server comprises: connecting the mobile computer to the network; locating the address server; requesting a represented address on the address server; and disconnecting the mobile computer from the network.

3. A method as in claim 1 wherein the mobile computer gives the represented address as its source address in all outgoing messages and when requesting services from other computers on the network.

4. A method for connecting a mobile computer to a computer network on an internet of connected networks by using an address server, the method comprising the steps of:
   establishing the address server on a network on the internet;
   representing the mobile computer by a represented address on the address server;
   connecting the mobile computer to a network on the internet, and reporting its new network and new actual address to the address server;
   at the address server, redirecting packets to the represented address to the new network and new actual address of the mobile computer, except blocking broadcasted routing table maintenance protocol packets; and
   repeating the connecting and redirecting steps as the mobile computer moves to new networks and addresses.

5. A method as in claim 4 wherein the step of representing the mobile computer by a represented address on the address server comprises: connecting the mobile computer to the network; locating the address server; requesting a represented address on the address server; and disconnecting the mobile computer from the network.

6. A method as in claim 4 wherein the mobile computer gives the represented address as its source address in all outgoing messages and when requesting services from other computers on the network.

7. A method for connecting a mobile computer to a computer network by using an address server, the method comprising the steps of:
   establishing an address server on a network;
   connecting the mobile computer to a network at a first address;
   locating the address server by the mobile computer;
   requesting a represented address on the address server by the mobile computer;
   receiving a represented address;
   modifying messages sent by the mobile computer to report the represented address as the source of the messages;
   at the address server, receiving messages sent to the represented address and redirecting them to the first address of the mobile computer, except blocking broadcasted routing table maintenance protocol packets;
   moving the mobile computer to a new location and connecting the mobile computer to a network at a new address;
   contacting the address server by the mobile computer to report the new address of the mobile computer; and
   at the address server, redirecting messages sent to the represented address to the new address of the mobile computer, except blocking broadcasted routing table maintenance protocol packets.

* * * * *